United States Patent [19]

Criquilion

[11] Patent Number: 5,252,651
[45] Date of Patent: Oct. 12, 1993

[54] RIGID COMPOSITIONS BASED ON POLYVINYL CHLORIDE COMPRISING AN ALIPHATIC POLYOL AS A VISCOSITY REDUCER AND USE OF THESE COMPOSITIONS FOR MANUFACTURING RIGID ARTICLES BY INJECTION MOULDING

[75] Inventor: Jean Criquilion, Brussels, Belgium

[73] Assignee: Solvay S.A., Brussels, Belgium

[21] Appl. No.: 530,805

[22] Filed: May 30, 1990

[30] Foreign Application Priority Data

Jun. 2, 1989 [BE] Belgium ............................ 08900603

[51] Int. Cl.$^5$ ................................................ C08J 5/05
[52] U.S. Cl. .................................. 524/388; 524/399; 524/434
[58] Field of Search ....................... 524/388, 399, 434

[56] References Cited

FOREIGN PATENT DOCUMENTS 0058447  8/1982  European Pat. Off. .
57-44665  3/1982  Japan .

OTHER PUBLICATIONS

Patent Abstracts of Japan; vol. 6, No. 118 (6–111) [996], Jul. 2, 1982.
Sarvetnick, Harold A., "Polyvinyl Chloride," Reinhold Plastics Application Series (1969), pp. 98 to 127.
Hanley's Condensed Chemical Dictionary 11th ed. p. 692.
Harold A. Sarvetnick "Polyvinyl Chloride", 1969 p. 98.

*Primary Examiner*—Joseph L. Schofer
*Assistant Examiner*—Peter D. Mulcahy
*Attorney, Agent, or Firm*—Spencer, Frank & Schneider

[57] ABSTRACT

The compositions contain di-trimethylolpropane as a viscosity reducer in a proportion of 6 to 9 parts by weight per 100 parts of polyvinyl chloride. They advantageously contain a lead compound as primary heat stabilizer and a neutral lead carboxylate derived from $C_8$–$C_{30}$ fatty acids as lubricant. The compositions are particularly suitable for the manufacture of rigid articles such as housings for office processing equipment and for radio and television sets and gratings for cooling towers, by injection moulding.

6 Claims, No Drawings

RIGID COMPOSITIONS BASED ON POLYVINYL CHLORIDE COMPRISING AN ALIPHATIC POLYOL AS A VISCOSITY REDUCER AND USE OF THESE COMPOSITIONS FOR MANUFACTURING RIGID ARTICLES BY INJECTION MOULDING

The present invention relates to rigid compositions based on polyvinyl chloride comprising an aliphatic polyol as a viscosity reducer. It also relates to the use of these compositions for the manufacture of rigid articles by injection moulding.

Polyvinyl chloride is a thermoplastic polymer which can be employed for manufacturing very diverse rigid articles by all the conventional techniques for converting thermoplastics in the molten state, such as calendering, moulding or extrusion. The milling, the extrusion, the calendering and the moulding of rigid polyvinyl chloride compositions require the application of shearing forces, with a view to ensuring the homogeneity and the flow of the molten mass, and these are proportionately greater the higher the melt viscosity. Furthermore, the application of high shearing forces generates frictional heat in quantities which are liable to give rise to thermal degradation of the polyvinyl chloride. A known means for reducing the melt viscosity of the rigid polyvinyl chloride compositions consists in making use of vinyl chloride polymers of low molecular weights. Nevertheless, in this case the reduction in melt viscosity is obtained at the expense of the mechanical properties of the manufactured objects. It is known, furthermore, that plasticizers reduce the melt viscosity of thermoplastic polymers. However, when the aim is to manufacture rigid wrought articles, resort to the use of plasticizers is ruled out, because the latter affect precisely the rigidity of the finished articles. It is therefore highly desirable to have access to viscosity-reducing additives, that is to say products which may be capable of effectively reducing the melt viscosity of rigid polyvinyl chloride compositions.

In Japanese patent application JA-A-77/74,650 of 19 Dec. 1975 in the name of Matsushita Electric Works Ltd. (summarized in Chemical Abstracts, volume 87 under number 118858 k), there is a description of the use of mannitol in a proportion of 0.3 to 4 parts per 100 parts by weight of polyvinyl chloride, as a "flow modifier" for rigid polyvinyl chloride. When a check was carried out, it turned out that the reduction in the melt viscosity which mannitol provides in this range of concentrations is insufficient for producing wrought articles of large sizes and low thicknesses and that the use of mannitol at higher concentration, in the hope of increasing the viscosity reduction effect, cannot in reality be envisaged because of an unacceptable effect from the standpoint of heat stability.

Japanese patent application JA-A-82/44,665 of 4 Jul. 1980 in the name of Koei Chemical Co. Ltd. (summarized in Chemical Abstracts, volume 97 under number 24702 j) describes the use of di-trimethylolpropane as a secondary heat stabilizer for vinyl chloride polymers in a proportion of 0.1 to 10 parts and, preferably, 0.5 to 5 parts by weight per 100 parts by weight of vinyl chloride polymer. In the examples of embodiment, 2 parts by weight at most of di-trimethylolpropane are used per 100 parts of polyvinyl chloride stabilized with the use of calcium and zinc stearates. The problem of the reduction of the melt viscosity of polyvinyl chloride is not touched upon in the document in question. Furthermore, the improvement in the heat stability of the polyvinyl chloride originates in questions which are completely different from that of the reduction in its melt viscosity.

The present invention is aimed at providing rigid compositions based on polyvinyl chloride comprising a polyol as a viscosity reducer, which do not exhibit the abovementioned disadvantages. To this end, the invention provides rigid compositions based on polyvinyl chloride containing di-trimethylolpropane as a viscosity reducer in a proportion of 6 to 9 parts by weight per 100 parts by weight of polyvinyl chloride. It has been found that di-trimethylolpropane, employed in a proportion of approximately 6 to 9 phr, forms a highly effective viscosity reducer for polyvinyl chloride, in which it does not affect either the heat stability or the heat resistance, that is to say the heat deformation temperature (HDT) or the Vicat point.

Di-trimethylolpropane is a solid aliphatic tetrol whose melting point is situated in the region of 109° C. and which corresponds to the formula:

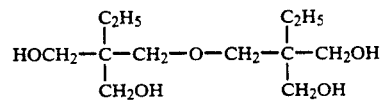

The optimum quantity of di-trimethylolpropane which it is appropriate to employ is advantageously evaluated experimentally. It depends, of course, on the intended result insofar as the reduction in melt viscosity is concerned, but also on the molecular weight of the polyvinyl chloride employed and on the nature and the concentration of the processing ingredients which are present in the rigid polyvinyl chloride compositions, such as lubricants, processing aids, fillers, and the like.

For the purposes of the present invention, polyvinyl chloride is intended to refer to vinyl chloride polymers containing at least 50 mol %, and preferably at least 70 mol %, of monomer units derived from vinyl chloride. The vinyl chloride polymers which are suitable for producing the compositions according to the invention thus include both vinyl chloride homopolymers and its copolymers containing monomer units derived from one or more comonomers. These copolymers may be graft copolymers on any backbone. By way of examples of vinyl chloride comonomers there may be mentioned olefins such as ethylene, propylene and styrene, esters such as vinyl acetate and alkyl acrylates and methacrylates, and vinylidene derivatives such as vinylidene chloride and fluoride. The compositions according to the invention are preferably based on vinyl chloride homopolymers.

The vinyl chloride polymers used may be manufactured by any method. It is therefore possible to employ for the manufacture of compositions according to the invention vinyl chloride polymers obtained by polymerization in bulk, in gaseous phase, in solution or in aqueous emulsion or suspension, the difference being of no consequence.

Apart from di-trimethylolpropane, the rigid compositions according to the invention include all the ingredients usually employed in the conversion of rigid polyvinyl chloride, such as heat stabilizers, lubricants, processing agents, impact modifiers, and the like. They may also contain fillers, pigments and the like. In the case of rigid compositions, in principle these are plasticizer-free. Nevertheless, they may contain it in minor quantities, less than 5 % by weight. All these ingredients are present in the usual concentrations. Examples of conventional heat stabilizers, lubricants, processing agents and impact modifiers for polyvinyl chloride are described, for example, in the work by H. A. Sarvetnick entitled: "Polyvinyl chloride", Reinhold Plastics Application Series, 1969, pp. 98-99; pp. 124-127 and pp. 120-124, incorporated by way of reference. Insofar as the liquid ingredients result in a decrease in the heat resistance of rigid polyvinyl chloride compositions, preference is given to solid ingredients (heat stabilizers, lubricants, and the like).

Particularly preferred compositions according to the present invention contain a lead compound, such as an organic or inorganic lead salt, as primary heat stabilizer. Examples of such primary lead heat stabilizers which may be mentioned are dibasic lead phosphate and phosphite, dibasic lead carbonate, basic lead silicate, lead chlorosilicate, tribasic or tetrabasic lead sulphates, lead phthalate, and basic lead stearates and neutral lead stearate, these latter having a lubricating effect and being often described as being lubricants. Preference is given to inorganic lead compounds.

Compositions which are very particularly preferred according to the present invention contain, apart from an inorganic lead compound as primary heat stabilizer, a neutral lead carboxylate derived from $C_8$-$C_{30}$ fatty acids, as a lubricant. It has been found that, in contrast to basic lead carboxylates such as, for example, dibasic lead stearate, neutral lead carboxylates act in synergy with di-trimethylolpropane in respect of the reduction in the melt viscosity of rigid polyvinyl chloride compositions, as they do, furthermore, in respect of dynamic heat stability. Examples of such neutral lead carboxylates which may be mentioned are the neutral lead caprylate, caprate, laurate, myristate, palmitate and stearate. Preference is given to neutral lead carboxylates derived from $C_{14}$-$C_{20}$ fatty acids and more particularly to neutral lead stearate. In the case where the composition contains a neutral lead carboxylate it is generally superfluous to include another lubricant therein. The neutral lead carboxylate derived from $C_8$-$C_{30}$ fatty acid is usually present in a proportion of approximately 1 to 3 parts per 100 parts by weight of polyvinyl chloride.

The compositions according to the invention may be processed by all the conventional techniques for melt-processing thermoplastic polymers, such as extrusion, calendering and injection moulding. They are particularly suitable for injection moulding, a conversion technique which is highly demanding from the viewpoint of the reduction in the melt viscosity of rigid compositions. The invention therefore also relates to the use of the rigid compositions according to the invention for manufacturing rigid articles by injection moulding. In the case of this use, preference is given to the compositions according to the invention which are heatstabilized by means of lead compounds and, still more particularly to those containing an inorganic lead compound as heat stabilizer and a neutral lead carboxylate as lubricant. By way of examples of rigid articles which can be manufactured by injection moulding the preferred compositions according to the invention there may be mentioned housings for office machinery and for radio and television sets, gratings for cooling towers, electrical switch boxes, filtration tanks, fan components, and the like.

The examples which follow are intended to illustrate the invention.

Examples 1, 3, 5 and 6, according to the invention, relate to compositions comprising 8 parts by weight of di-trimethylolpropane per 100 parts of polyvinyl chloride (phr). Examples 2, 4, 7 and 8, for comparison, relate to compositions not containing ditrimethylolpropane (Examples 2, 4, 7) or containing less than 6 phr thereof (Example 8). In Examples 1 and 2 the polyvinyl chloride employed is a vinyl chloride homopolymer of K value (measured at 25° C. in cyclohexanone) of 50 and obtained by polymerization in aqueous suspension. In Examples 3 to 8 the polyvinyl chloride employed is a vinyl chloride homopolymer of K value (measured at 25° C. in cyclohexanone) of 58 and obtained by polymerization in aqueous suspension.

Compositions were prepared on a fast mixer by hot mixing of the following ingredients, the quantities being expressed in parts by weight:

| | |
|---|---|
| Polyvinyl chloride | 100 |
| (Acrylic) impact modifier | 5 |
| (Acrylic) processing aids | 3 |
| Tribasic lead sulphate | 5 |
| Precipitated calcium carbonate | 5 |
| Titanium oxide | 2 |
| Di-trimethylolpropane | see table |
| Neutral lead stearate | " |
| Dibasic lead stearate | " |

After having sampled a part of the mixtures obtained with a view to evaluating their heat stability, the mixtures were pregelled at approximately 170° C. before being granulated.

The melt viscosity of the rigid compositions according to Examples 1 to 8 was evaluated by measuring the length of injection-moulded spirals.

The granules were injected into a screw press (equipped for the injection of rigid polyvinyl chloride) under a pressure of 1250 bars for 2 seconds into a spiral mould 15 mm in width and 2 mm in thickness. The metering stroke was adjusted so as to obtain a pad of material 2 mm in thickness at the end of the injection. The temperatures displayed on the barrel were adjusted so as to obtain a melt temperature of 200° C. at the exit. The moulded spirals were cooled for 20 seconds, after which their length was measured.

The appended table shows, in addition to the ditrimethylolpropane, neutral lead stearate and dibasic lead stearate content of the compositions, the results of the evaluation of the dynamic heat stability of the compositions, which is characterized by the Yellowness Index (YI) reached by the crepes milled for 20 minutes on a roll mill at 200° C., as well as the length of the moulded spirals, expressed in centimeters.

TABLE

| Example no. | Compositions | | | Evaluation | |
|---|---|---|---|---|---|
| | Di-trimethylol-propane, phr | Neutral lead stearate, phr | Dibasic lead stearate, phr | Length of the the spirals, cm | YI |
| 1 | 8 | 2 | — | 63 | 26.3 |
| 2 (R) | — | 2 | — | 43 | 25.0 |

TABLE-continued

| Example no. | Compositions | | | Evaluation | |
|---|---|---|---|---|---|
| | Di-trimethylol-propane, phr | Neutral lead stearate, phr | Dibasic lead stearate, phr | Length of the the spirals, cm | YI |
| 3 | 8 | 2 | — | 43 | 17.9 |
| 4 (R) | — | 2 | — | 26 | 31.0 |
| 5 | 8 | — | — | 39 | 32.7 |
| 6 | 8 | — | 1.5 | 38 | 26.6 |
| 7 (R) | — | — | 1.5 | 23 | 61.4 |
| 8 (R) | 4 | — | 1.5 | 29.5 | 42.2 |

I claim:

1. A rigid composition comprising a) polyvinyl chloride, b) an inorganic lead compound as a primary heat stabilizer, c) ditrimethylolpropane present as a viscosity reducer in a proportion of 6 to 9 parts by weight per 100 parts by weight of said polyvinyl chloride, and d) a neutral lead carboxylate derived from a fatty acid containing 8 to 30 carbon atoms as a lubricant.

2. The rigid composition according to claim 1, wherein said b) inorganic lead compound as a primary heat stabilizer is an inorganic lead salt.

3. The rigid composition according to claim 2, wherein said d) neutral lead carboxylate is present in an amount from about 1 to 3 parts by weight per 100 parts by weight of said a) polyvinyl chloride.

4. The rigid composition according to claim 1, wherein said d) neutral lead carboxylate is derived from a fatty acid containing 14 to 20 carbon atoms.

5. The rigid composition according to claim 4, wherein said d) neutral lead carboxylate is neutral lead stearate.

6. The rigid composition according to claim 1, wherein said a) polyvinyl chloride is a vinyl chloride homopolymer.

* * * * *